Patented Feb. 13, 1945

2,369,125

UNITED STATES PATENT OFFICE 2,369,125

ROSIN ESTERS AND METHOD OF PRODUCING

Gilbert R. Anderson, Elsmere, Del., assignor to Hercules Powder Company, Wilmington, Del., a corporation of Delaware No Drawing. Application June 28, 1941, Serial No. 400,349

15 Claims. (Cl. 260—104)

This invention relates to an improved method of producing rosin esters and to the improved rosin esters obtained. More particularly it relates to a method of esterifying natural rosins to provide esters of high oxygen resistance.

The natural rosins and the rosin acids contained therein are unsaturated. During the normal esterification of such rosins as practiced in the art substantially no change in the unsaturation characteristics of the rosin molecule occurs. As a result, the natural rosin esters prepared by the known methods of esterification have always been particularly subject to oxidation in the presence of oxygen. Such natural rosin esters absorb as much as 8% of their weight of oxygen on continued exposure to oxygen-containing atmospheres. The oxygen absorption of such rosin esters is also accompanied by an embrittlement and by a discoloration of the ester. To avoid these deficiencies of the natural rosin esters the art has turned to modification of the rosin nucleus such as may be accomplished by hydrogenation. It has been found that hydrogenation of the natural rosin or of the rosin ester reduces the effect of oxygen on the ester and thereby provides rosin esters which do not embrittle or discolor on aging. Hydrogenation of rosin or rosin esters, however, is a relatively expensive process requiring complex and expensive equipment.

It is an object of this invention to provide a method for obtaining natural rosin esters of high oxygen resistance by an improved esterification procedure. It is another object to provide an economical and convenient method for producing rosin esters of high oxygen resistance. It is a further object to provide a method of obtaining polyhydric alcohol esters of natural rosins, and particularly the glycerol esters, which are higher melting than the comparable esters as prepared by prior esterification procedures. Another object of the invention is to provide a new series of rosin esters of improved chemical and physical characteristics. Other objects of the invention will appear hereinafter.

The above objects are accomplished in accordance with this invention by esterifying a natural rosin with an alcohol under conditions of temperature and time of heating which are substantially more drastic than any prior art practices. Thus, it has been found that by carrying out the esterification of a natural rosin with an alcohol at a temperature within the range of about 285° C. to about 325° C. for a period of time in excess of about 10 hours that a new type of ester is obtained. Smaller excesses over the equivalent amount of the alcohol than have been possible heretofore may be used to give substantially neutral esters.

The natural rosins which may be used in practicing the invention comprise any of the various grades of wood and gum rosin or the rosin acids contained therein as for example, abietic acid, pimaric acid, sapinic acid, etc. If desired, the natural rosin may be subjected to a heat treatment at elevated temperatures prior to esterification. In carrying out the esterification process any of the monohydric or polyhydric alcohols normally used for esterifying rosin may be employed. Thus, the monohydric alcohols such as methyl alcohol, ethyl alcohol, propyl alcohol, butyl alcohol, the ethyl ether of ethylene glycol, the ethyl ether of diethylene glycol, etc., are useful. As polyhydric alcohols ethylene glycol, propylene glycol, diethylene glycol, triethylene glycol, tetraethylene glycol, trimethylene glycol, glycerol, pentaerythritol, dipentaerythritol, mannitol, sorbitol, as well as other similar polyhydric alcohols may be used. In the case of the lower boiling alcohols the esterification may be carried out under superatmospheric pressure to avoid volatilization of the alcohol component. The amount of the alcohol used in the esterification may be varied widely but generally no more than a slight excess over the equivalent combining proportion will be necessary. This is particularly true in the case of the polyhydric alcohols and is particularly advantageous in connection with such alcohols because removal of unreacted alcohol at the completion of the esterification is difficult.

The improvement over the art brought about by this invention is a function of both the temperature and the time employed in the esterification reaction. A temperature of at least 285° C. has been found necessary to provide the novel type ester. Temperatures as high as 285° C., and in some cases higher, have been employed previously in rosin esterification but the time at which such esterification has been carried out has been far too short to bring about the characteristic change in the form of the ester described in accordance with this invention. By employing reaction temperatures appreciably above 285° C. the time required to produce the change in characteristics is shortened. There is thus a distinct relationship between the time and temperature factors. Temperatures above about 325° C. are not practical since such temperatures cause a decomposition of the rosin molecule with formation of rosin oil. An esterification time below about 10 hours in the range of 285 to 325° C. will not provide the ester having the novel characteristics. An esterification time of at least 10 hours must therefore be employed. There is no critical limit to the maximum time of esterification, but economy of operation will favor the minimum time necessary to provide the desired result. At temperatures of 285° C. heating times above about 20 hours are practical. Since natural rosins tend to discolor at these elevated temperatures of heating it is desirable to carry out the esterification in a non-oxidizing atmosphere such as may be provided by an inert gas as carbon dioxide, nitrogen, etc., or by the vapors of the alcohol itself.

As an analytical means of defining the oxygen resistance of the improved esters produced in accordance with this invention it is convenient to employ an oxygen bomb test. Thus, where oxygen absorption values are shown in the examples and claims such values represent the percentage gain in weight of the sample after being subjected to oxygen at 300 pounds per square inch pressure in a bomb for 160 hours. Such a drastic oxidation test corresponds to very extended exposure to normal atmospheres and in most cases represents the maximum effect of oxygen on the ester. In carrying out such a test, a 10 gram sample of the ester is employed and the oxygen pick-up of the ester is measured gravimetrically by the increase in weight. The esters produced in accordance with this invention are characterized by having an oxygen absorption value below about 1% as measured by the above bomb test. Ordinary natural rosin esters prepared by the prior art methods of esterification have much higher oxygen absorption values. For example, by esterifying a natural rosin with glycerol at a temperature of 270° C. for 7 hours, which corresponds to the commercial procedures for preparing ester gum, esters having oxygen absorption values above about 4% are obtained.

The improved rosin esters obtained in accordance with this invention are clearly differentiated from the natural rosin esters of the prior art on the basis of their different chemical and physical characteristics. In addition to having an oxygen absorption value below about 1%, and preferably below about .75%, the esters exhibit much less discoloration by light than ordinary rosin esters. They also are characterized by having substantially no crystallizing tendencies, particularly from solutions in organic solvents. A very disturbing disadvantage of solid rosin esters such as the glycerol ester has been the crystallization from concentrated organic solvents such as ethyl acetate or butyl acetate. When solutions in such solvents of the prior art rosin-polyhydric alcohol esters have been allowed to stand, it has been found that in a relatively short time crystallization of a considerable portion of the rosin ester occurs. Also the improved rosin esters prepared by this invention, and particularly the polyhydric alcohol esters, possess higher melting points than are obtainable from the same reaction components by the prior art esterification procedures.

As illustrative of the various embodiments of the invention the following examples are typical:

Example I

One hundred parts by weight of N wood rosin and 9.5 parts by weight of glycerol were heated together in a carbon dioxide atmosphere at a temperature of 285° C. for 20 hours. The rosin ester resulting had the following characteristics:

Acid number _____ 15
Melting point (drop) _____°C__ 105
Color _____ 28 Amber (Lovibond)
Oxygen absorption value_____per cent__ 0.50

Example II

One hundred parts by weight of N wood rosin and 12 parts by weight of glycerol were heated together in a carbon dioxide atmosphere at a temperature of 300° C. for 15 hours. The ester obtained had the following characteristics:

Acid number_____ 7.5
Melting point (drop) _____°C__ 107
Color _____ K
Oxygen absorption value_____per cent__ 0.49

A comparable glycerol ester prepared by heating the same ingredients at 270° C. for 7 hours had an acid number of 7, a melting point of 89° C., a color of WG, and an oxygen absorption value of 8.48%.

Example III

One hundred parts by weight of N wood rosin and 11 parts by weight of pentaerythritol were heated together in a carbon dioxide atmosphere at a temperature of 285° C. for 14 hours. The ester resulting had an acid number of 14, a melting point (drop) of 113° C., a color of N and an oxygen absorption value of 0.40%.

Example IV

Two hundred and twenty-five parts by weight of N wood rosin, 375 parts by weight of methyl alcohol and 1.2 parts by weight of iron resinate were heated together in an autoclave at a temperature of 315° C. and a pressure rising to 1100 lbs./in.$^2$ for 5 hours. The reaction product was cooled and the uncombined methyl alcohol together with the water present were removed by distillation. To the residue 300 parts of fresh methyl alcohol were added and the esterification continued in the autoclave at 315° C. and 1100 lbs./in.$^2$ for 7 more hours. The reaction product was cooled and the methyl alcohol and water removed by distillation. The methyl ester of the rosin was then distilled under reduced pressure. The distilled ester had an acid number of 10 and an oxygen absorption value of 0.70%.

Example V

One hundred parts by weight of M gum rosin and 11 parts by weight of pentaerythritol were heated together in a carbon dioxide atmosphere at a temperature of 285° C. for 13 hours. The resulting ester had an acid number of 12, a melting point (drop) of 131° C., a color of M and an oxygen absorption value of 0.47%.

The improved natural rosin esters described in accordance with this invention will be considerably more desirable than the ordinary rosin esters in the various applications of such esters in the arts. In lacquers they will be subject to less discoloration and the films obtained will not embrittle to the extent of the prior esters. In varnishes they will provide more desirable coatings which will be more resistant to embrittlement and discoloration.

It will be understood that the details and examples hereinbefore set forth are illustrative only and that the invention as broadly described and claimed is in no way limited thereby.

What I claim and desire to protect by Letters Patent is:

1. The method of producing a rosin ester of high oxygen resistance which comprises heating a reaction mixture consisting of a natural rosin and an alcohol at a temperature within the range of about 285° C. to about 325° C. for a period of time in excess of about 10 hours and until an ester is formed having an oxygen absorption value below about 1%.

2. The method of producing a rosin ester of high oxygen resistance which comprises heating a reaction mixture consisting of a natural rosin and a monohydric alcohol at a temperature within the range of about 285° C. to about 325° C. for a period of time in excess of about 10 hours and until an ester is formed having an oxygen absorption value below about 1%.

3. The method of producing a rosin ester of high oxygen resistance which comprises heating a reaction mixture consisting of a natural rosin and a polyhydric alcohol at a temperature within the range of about 285° C. to about 325° C. for a period of time in excess of about 10 hours and until an ester is formed having an oxygen absorption value below about 1%.

4. The method of producing a rosin ester of high oxygen resistance which comprises heating a reaction mixture consisting of a natural rosin and methyl alcohol at a temperature within the range of about 285 to about 325° C. for a period of time in excess of about 10 hours and until an ester is formed having an oxygen absorption value below about 1%.

5. The method of producing a rosin ester of high oxygen resistance which comprises heating a reaction mixture consisting of a natural rosin and glycerol at a temperature within the range of about 285° C. to about 325° C. for a period of time in excess of about 10 hours and until an ester is formed having an oxygen absorption value below about 1%.

6. The method of producing a rosin ester of high oxygen resistance which comprises heating a reaction mixture consisting of a natural rosin and pentaerythritol at a temperature within the range of about 285° C. to about 325° C. for a period of time in excess of about 10 hours and until an ester is formed having an oxygen absorption value below about 1%.

7. The method of producing a rosin ester of high oxygen resistance which comprises heating a reaction mixture consisting of a natural rosin and an alcohol at a temperature within the range of about 290° C. to about 310° C. for a period of time in excess of about 10 hours and until an ester is formed having an oxygen absorption value below about 1%.

8. The method of producing a rosin ester of high oxygen resistance which comprises heating a reaction mixture consisting of a natural rosin and a polyhydric alcohol at a temperature within the range of about 290° C. to about 310° C. for a period of time in excess of about 10 hours and until an ester is formed having an oxygen absorption value below about 1%.

9. The method of producing an ester gum of high oxygen resistance which comprises heating a reaction mixture consisting of a natural rosin and glycerol at a temperature of about 300° C. for about 15 hours.

10. As a new composition of matter, a natural rosin ester characterized by substantial resistance to oxidation, by freedom from crystallizing tendencies and by an oxygen absorption value below about 1%, produced by heating a reaction mixture consisting of a natural rosin and an alcohol at a temperature within the range of about 285° C. to about 325° C. for a period of time in excess of about 10 hours and until an ester having an oxygen absorption value below about 1% is formed.

11. As a new composition of matter, a monohydric alcohol ester of a natural rosin characterized by substantial resistance to oxidation, by freedom from crystallizing tendencies and by an oxygen absorption value below about 1%, produced by heating a reaction mixture consisting of a natural rosin and a monohydric alcohol at a temperature within the range of about 285° C. to about 325° C. for a period of time in excess of about 10 hours and until an ester having an oxygen absorption value below about 1% is formed.

12. As a new composition of matter, a polyhydric alcohol ester of a natural rosin characterized by substantial resistance to oxidation, by freedom from crystallizing tendencies and by an oxygen absorption value below about 1%, produced by heating a reaction mixture consisting of a natural rosin and a polyhydric alcohol at a temperature within the range of about 285° C. to about 325° C. for a period of time in excess of about 10 hours and until an ester having an oxygen absorption value below about 1% is formed.

13. As a new composition of matter, a methyl ester of a natural rosin characterized by substantial resistance to oxidation, by freedom from crystallizing tendencies and by an oxygen absorption value below about 1%, produced by heating a reaction mixture consisting of a natural rosin and methyl alcohol at a temperature within the range of about 285° C. to about 325° C. for a period of time in excess of about 10 hours and until an ester having an oxygen absorption value below about 1% is formed.

14. As a new composition of matter, a glycerol ester of a natural rosin characterized by substantial resistance to oxidation, by freedom from crystallizing tendencies and by an oxygen absorption value below about 1%, produced by heating a reaction mixture consisting of a natural rosin and glycerol at a temperature within the range of about 285° C. to about 325° C. for a period of time in excess of about 10 hours and until an ester having an oxygen absorption value below about 1% is formed.

15. As a new composition of matter, a pentaerythritol ester of a natural rosin characterized by substantial resistance to oxidation, by freedom from crystallizing tendencies and by an oxygen absorption value below about 1%, produced by heating a reaction mixture consisting of a natural rosin and pentaerythritol at a temperature within the range of about 285° C. to about 325° C. for a period of time in excess of about 10 hours and until an ester having an oxygen absorption value below about 1% is formed.

GILBERT R. ANDERSON.